(12) United States Patent
Chittor et al.

(10) Patent No.: US 11,567,877 B2
(45) Date of Patent: Jan. 31, 2023

(54) MEMORY UTILIZED AS BOTH SYSTEM MEMORY AND NEAR MEMORY

(71) Applicant: Intel Corporation, Santa Clara, CA (US)

(72) Inventors: Suresh S. Chittor, Portland, OR (US); Rajat Agarwal, Portland, OR (US); Wei P. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 16/402,734

(22) Filed: May 3, 2019

(65) Prior Publication Data

US 2019/0258583 A1 Aug. 22, 2019

(51) Int. Cl.
*G06F 12/0893* (2016.01)

(52) U.S. Cl.
CPC .. *G06F 12/0893* (2013.01); *G06F 2212/1044* (2013.01); *G06F 2212/6012* (2013.01)

(58) Field of Classification Search
CPC ............. G06F 12/0897; G06F 12/0893; G06F 2212/6012
See application file for complete search history.

(56) References Cited

U.S. PATENT DOCUMENTS

| | | | | |
|---|---|---|---|---|
| 2014/0229659 A1* | 8/2014 | Jones | ................... | G06F 3/0659 |
| | | | | 711/103 |
| 2014/0297919 A1* | 10/2014 | Nachimuthu | ........ | G11C 14/009 |
| | | | | 711/102 |
| 2015/0227469 A1* | 8/2015 | Zyulkyarov | .......... | G06F 12/126 |
| | | | | 711/207 |
| 2016/0210230 A1* | 7/2016 | Wang | .................. | G06F 12/0811 |
| 2016/0224252 A1* | 8/2016 | Hutsell | ............... | G06F 12/0802 |
| 2017/0091093 A1* | 3/2017 | Wang | ................... | G06F 3/0685 |
| 2018/0024932 A1* | 1/2018 | Nachimuthu | ......... | G06F 9/4401 |
| | | | | 711/213 |
| 2019/0042145 A1* | 2/2019 | Pham | .................. | G06F 12/1027 |
| 2019/0042436 A1* | 2/2019 | Klemm | ............... | G06F 12/0871 |
| 2019/0079866 A1* | 3/2019 | Weiss | .................. | G06F 12/0897 |

* cited by examiner

*Primary Examiner* — Baboucarr Faal
(74) *Attorney, Agent, or Firm* — Essential Patents Group, LLP

(57) ABSTRACT

An embodiment of a memory controller device includes technology to control access to a multi-level memory including at least a first level memory and a second level memory, provide direct access to the first level memory based on a system memory address, cache accesses to the second level memory in a second portion of the first level memory, and address a memory space with a total memory capacity which includes a first capacity of the first portion of the first level memory plus a second capacity of the second level memory. Other embodiments are disclosed and claimed.

19 Claims, 8 Drawing Sheets

SYSTEM PHYSICAL ADDRESS (SPA (A, B, C))

| TAG | SET ADDRESS |
|---|---|

00: SPA0
01: SPA1
10: SPA2

FIG. 6B

| LOC_0/1/2 | ENCODING[0:2] |
|---|---|
| ABC | 3'b 0 0 0 |
| ACB | 3'b 0 0 1 |
| BAC | 3'b 0 1 0 |
| BCA | 3'b 0 1 1 |
| CBA | 3'b 1 0 0 |
| CAB | 3'b 1 0 1 |

TAG
00: NM has A
01: NM has B
10: NM has C

Prefer/Non-Prefer:
0: Home
1: Not home

FIG. 6C

MEMORY UTILIZED AS BOTH SYSTEM MEMORY AND NEAR MEMORY

BACKGROUND

Computing systems or platforms may utilize various memory arrangements. A two-level memory (2LM) system may include near memory (NM) and far memory (FM). A 2LM system may be utilized as main memory in a computer system. The FM is generally higher capacity and slower than the NM.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6B is an illustrative diagram of an example of a system physical address according to an embodiment;

FIG. 6C is an illustrative diagram of an example of a look up table for tag encoding according to an embodiment;

DETAILED DESCRIPTION

Figure 1:
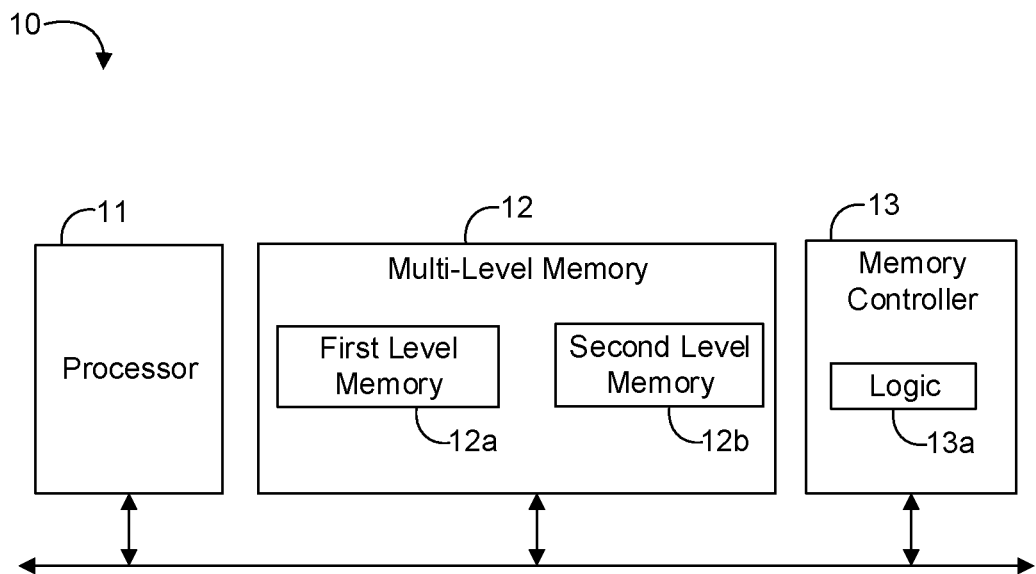
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to memory systems. More particularly, some embodiments relate to memory utilized as both system memory and NM.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4B for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

In particular embodiments, high bandwidth memory (HBM) DRAM may comply with a standard promulgated by JEDEC, such as JESD235B for HBM (this standards are available at jedec.org). As noted at www.jedec.org, HBM DRAM is tightly coupled to the host compute die with a distributed interface. The interface is divided into independent channels. Each channel is completely independent of one another. Channels are not necessarily synchronous to each other. The HBM DRAM uses a wide-interface architecture to achieve high-speed, low-power operation. The HBM DRAM uses differential clock CK_t/CK_c. Commands are registered at the rising edge of CK_t, CK_c. Each channel interface maintains a 128 b data bus operating at DDR data rates. Such standards (and similar standards) may be referred to as HBM-based standards and communication interfaces of the storage devices that implement such standards may be referred to as HBM-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include a multi-level memory 12 including at least a first level memory 12a and a second level memory 12b, a processor 11 coupled to the multi-level memory 12, and a memory controller 13 coupled to the processor 11 and the multi-level memory 12, the memory controller including logic 13a to provide direct access to a first portion of the first level memory 12a based on a system memory address, cache accesses to the second level memory 12b in a second portion of the first level memory 12a, and address a memory space with a total memory capacity which includes a first capacity of the first portion of the first level memory 12a plus a second capacity of the second level memory 12b. In some embodiments, the logic 13a may be configured to encode a tag to indicate a location of data in one of the second portion of the first level memory 12a and the second level memory 12b. For example, the logic 13a may be configured to encode the tag to indicate whether data is located in the second portion of the first level memory 12a or one of two or more locations in the second level memory 12b.

In some embodiments of the system 10, the logic 13a may be further configured to determine if an access request for the multi-level memory 12 results in a tag match, and return data from the second portion of the first level memory 12a if the access request results in the tag match. The logic 13a may also be configured to swap data in the second portion of the first level memory 12a with data in the second level memory 12b if the access request results in a tag mismatch. In some embodiments, the logic 13a may also be configured to expose the total memory capacity to an operating system which includes the first capacity of the first portion of the first level memory 12a plus the second capacity of the second level memory 12b. In any of the embodiments herein, the first level memory 12a may include volatile memory (e.g., HBM) and the second level memory 12b may include memory (e.g., DDR memory) which is higher in capacity as compared to the first level memory 12a (e.g., which may be either volatile memory or nonvolatile memory).

Embodiments of each of the above processor 11, multi-level memory 12, first level memory 12a, second level memory 12b, memory controller 13, logic 13a, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a graphic processor, a controller, a micro-controller, etc. In some embodiments, the multi-level memory 12, first level memory 12a, second level memory 12b, memory controller 13, and/or the logic 13a may be located in, or co-located with, various components, including the processor 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the multi-level memory 12, persistent storage media, or other system memory may store a set of instructions which when executed by the processor 11 cause the system 10 to implement one or more components, features, or aspects of the system 10 (e.g., the logic 13a, providing direct access to the first level memory based on the system memory address, caching accesses to the second level memory in the second portion of the first level memory, etc.).

Figure 2:
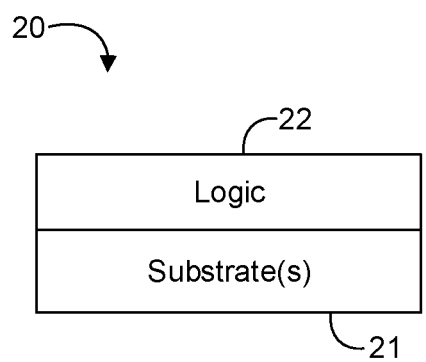
FIG. 2 is a block diagram of an example of an electronic memory controller apparatus according to an embodiment.

With reference to FIG. 2, an embodiment of an electronic memory controller apparatus 20 may include a substrate 21, and logic 22 coupled to the substrate 21. The logic 22 may be configured to control access to a multi-level memory including at least a first level memory and a second level memory, provide direct access to a first portion of the first level memory based on a system memory address, cache accesses to the second level memory in a second portion of the first level memory, and address a memory space with a total memory capacity which includes a first capacity of the first portion of the first level memory plus a second capacity of the second level memory. In some embodiments, the logic 22 may be configured to encode a tag to indicate a location of data in one of the second portion of the first level memory and the second level memory. For example, the logic 22 may be configured to encode the tag to indicate whether data is located in the second portion of the first level memory or one of two or more locations in the second level memory.

In some embodiments of the apparatus 20, the logic 22 may be further configured to determine if an access request for the multi-level memory results in a tag match, and return data from the second portion of the first level memory if the access request results in the tag match. For example, the logic 22 may also be configured to swap data in the second portion of the first level memory with data in the second level memory if the access request results in a tag mismatch. In some embodiments, the logic 22 may be further configured to expose the total memory capacity to an operating system which includes the first capacity of the first portion of the first level memory plus the second capacity of the second level memory. In any of the embodiments herein, the first level memory may include HBM and the second level memory may include DDR memory which is higher in capacity as compared to the first level memory.

In some embodiments, the illustrated apparatus 20 may be implemented as discrete components on a printed circuit board (PCB) substrate, or electronic/digital circuitry on one or more semiconductor substrate(s) (e.g., silicon, sapphire, gallium arsenide, a SoC, etc.) with suitable logic coupled to the substrate(s). In some embodiments, the logic 22 may be at least partly implemented in one or more of configurable logic and fixed-functionality hardware logic on semiconductor substrate(s). For example, the logic 22 may include a transistor array and/or other integrated circuit components coupled to the substrate(s) with transistor channel regions that are positioned within the substrate(s). The interface between the logic 22 and the substrate(s) may not be an abrupt junction. The logic 22 may also be considered to include an epitaxial layer that is grown on an initial wafer of the substrate(s).

Figure 3A:
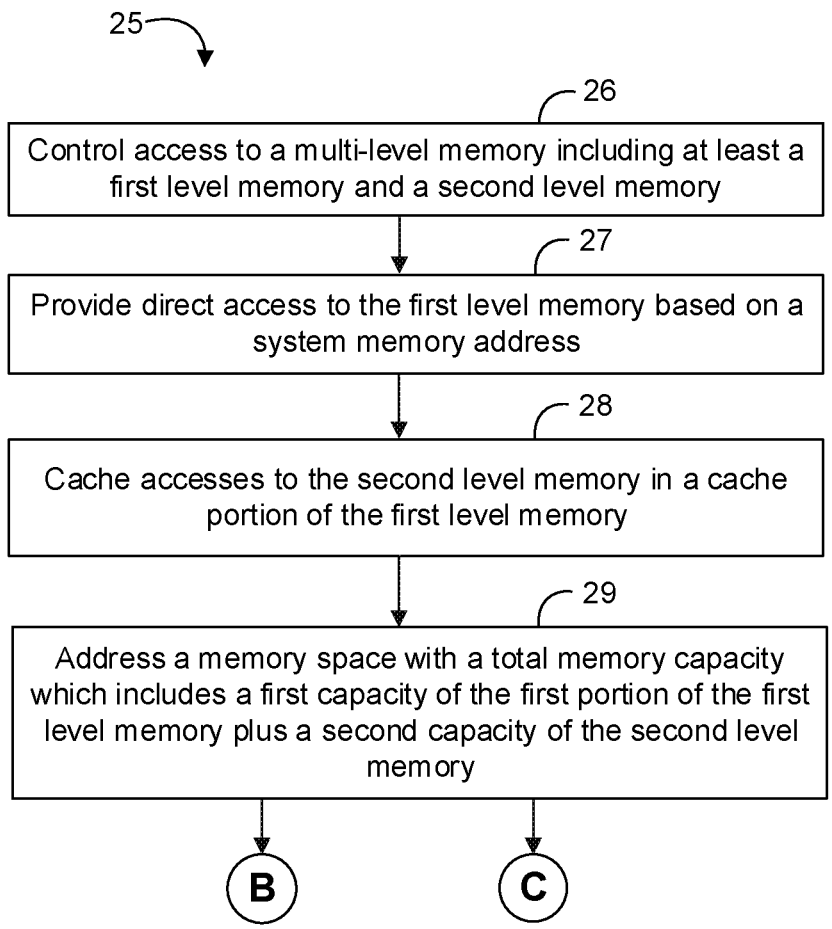
FIGS. 3A to 3C are flowcharts of an example of a method of controlling memory according to an embodiment.
Figure 3B:
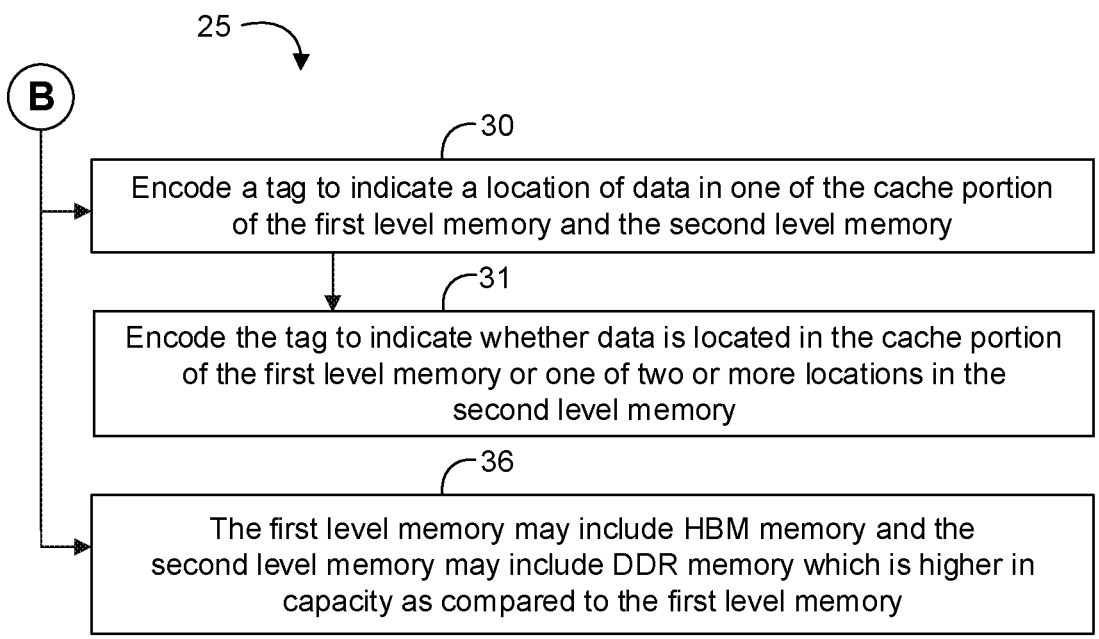
Figure 3C:
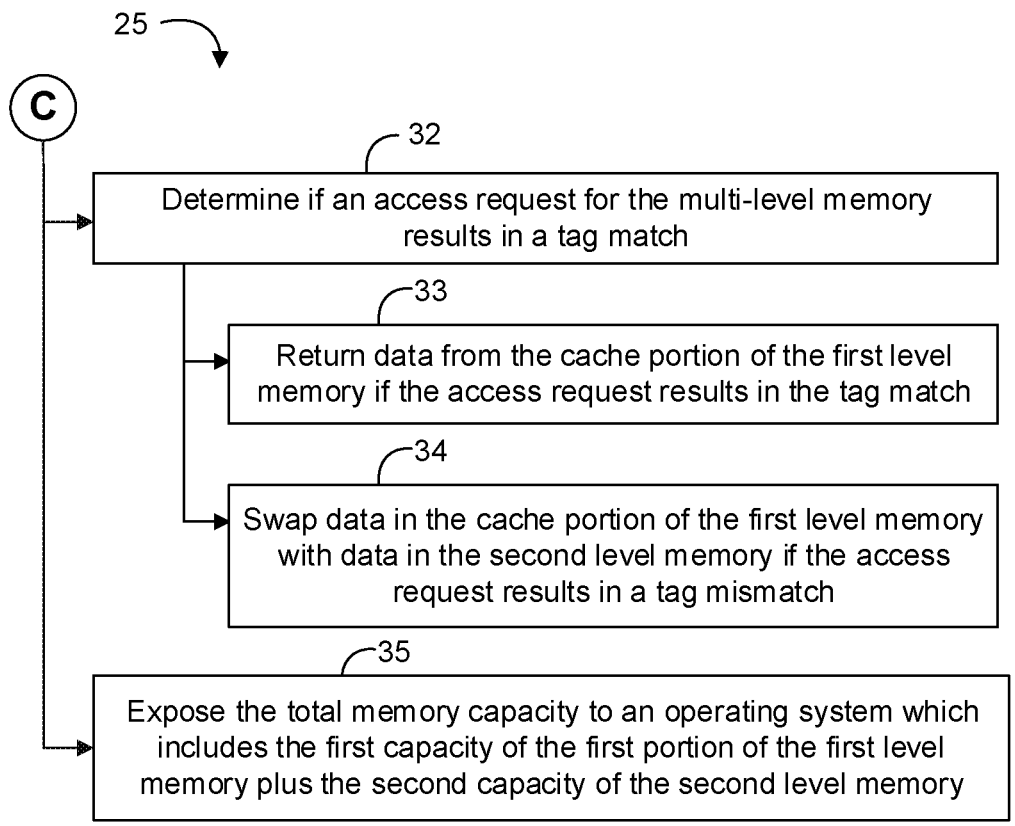

Turning now to FIGS. 3A to 3C, an embodiment of a method 25 of controlling memory may include controlling access to a multi-level memory including at least a first level memory and a second level memory at block 26, providing direct access to a first portion of the first level memory based on a system memory address at block 27, caching accesses to the second level memory in a second portion of the first level memory at block 28, and addressing a memory space with a total memory capacity which includes a first capacity of the first portion of the first level memory plus a second capacity of the second level memory at block 29. Some embodiments of the method 25 may include encoding a tag to indicate a location of data in one of the second portion of the first level memory and the second level memory at block 30. For example, the method 25 may include encoding the tag to indicate whether data is located in the second portion of the first level memory or one of two or more locations in the second level memory at block 31.

Some embodiments of the method 25 may further include determining if an access request for the multi-level memory results in a tag match at block 32, and returning data from the second portion of the first level memory if the access request results in the tag match at block 33. The method 25 may also include swapping data in the second portion of the first level memory with data in the second level memory if the access request results in a tag mismatch at block 34. Some embodiments of the method 25 may further include exposing the total memory capacity to an operating system which includes the first capacity of the first portion of the first level memory plus the second capacity of the second level memory at block 35. In any of the embodiments herein, the first level memory may include HBM and the second level memory may include DDR memory which is higher in capacity as compared to the first level memory at block 36.

Embodiments of the method 25 may be implemented in a system, apparatus, computer, device, etc., for example, such as those described herein (e.g., the system 10, the apparatus 20, system 40, system 50, system 60, etc.). More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 22 to 28 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to utilize NM as both memory-side-cache and direct-accessed memory at the same time during operation. A two-level memory (2LM) may include a near memory (NM) which may be smaller and faster, and a far memory (FM) which may be larger and slower. In some systems, the NM may be placed outside the central processor unit (CPU) die. During operation, each miss in the NM may cause data to be brought in from the FM and then fill the data in the NM. In some systems, the 2LM may serve as the system memory or main memory for the system. In a conventional 2LM, the FM size may be the size of the available memory from the OS perspective and the NM may serve as a cache (e.g., with the NM size unknown to the OS). When DDR memory or HBM is used for a memory-side-cache, the capacity is essentially lost and not usable by the system. This increases cost of ownership for systems which otherwise benefit from 2LM performance Some embodiments advantageously allow NM (e.g., DDR or HBM devices) to be used as a memory-side-cache and also directly accessed memory at the same time. All or some of the NM capacity is visible to the system, advantageously increasing the overall memory capacity. At the same time, embodiments of a system may benefit from a 2LM arrangement with NM (e.g., HBM, etc.) performance and large FM capacity (e.g., DDR, INTEL 3DXPOINT, etc.).

Memory capacity and cost continue to rise from generation to generation. In some systems, the memory may be a large portion of the system total cost of ownership (TCO), sometimes costing more than the CPU. While 2LM may provide better performance and capacity, the cost of the NM portion of a conventional 2LM system may have no direct value return. Some embodiments may advantageously allow the NM capacity to be re-claimed and used by the system directly and at the same time the NM may be used a memory-side-cache in a 2LM arrangement. For example, in a system with embodiments of the technology described herein, the total memory capacity exposed to the OS and/or SW may include the NM capacity plus the FM capacity.

Figure 4:
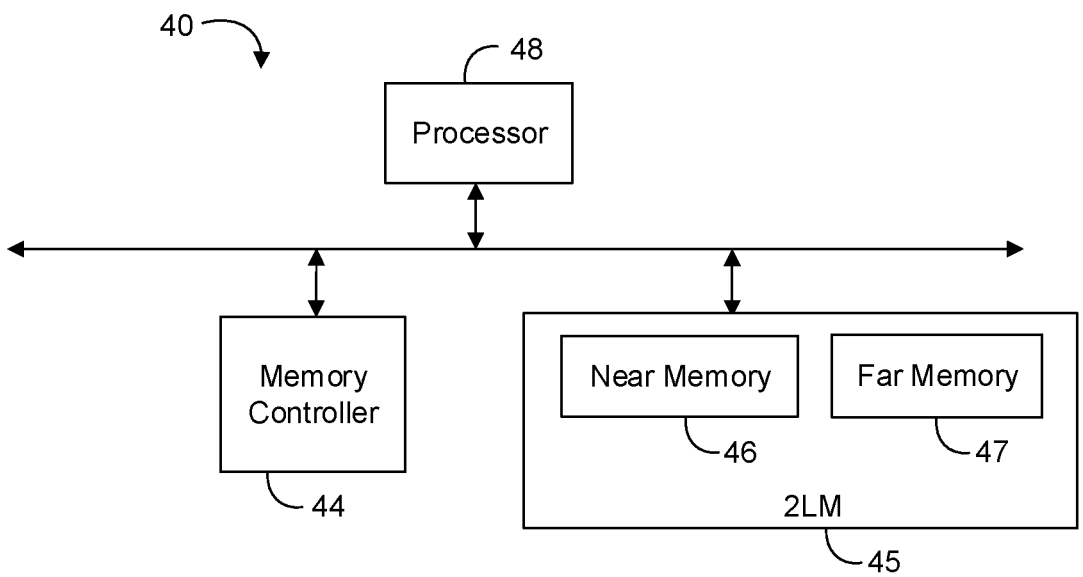
FIG. 4 is a block diagram of an example of another electronic system according to an embodiment.

Turning now to FIG. 4, an embodiment of an electronic system 40 may include a processor 48, a memory controller 44, and a two-level memory (2LM) 45 including a NM 46 and a FM 47. In various embodiments, any of the NM 46 and the FM 47 may include volatile memory and/or nonvolatile memory. For example, the 2LM 45 may correspond to system memory or main memory including the NM 46 and the FM 47. The NM 46 may include smaller, faster DRAM. The FM 47 may include larger capacity memory.

The memory controller 44 may be communicatively coupled to the processor 48 and the 2LM 45. In some embodiments, the memory controller 44 may be configured to control access to the 2LM 45, provide direct access to a system memory portion of the NM 46 based on a system memory address, and cache accesses to the FM 47 in a cache portion of the NM 46. The memory controller 44 may be configured to address a memory space with a total memory capacity which includes the capacity of the system memory portion of the NM 46 plus the capacity of the FM 47. In some embodiments, the memory controller 44 may be configured to encode a tag to indicate a location of data in one of the cache portion of the NM 46 and the FM 47. For example, memory controller 44 may be configured to encode the tag to indicate whether data is located in the cache portion of the NM 46 or one of two or more locations in the FM 47.

In some embodiments of the system 40, the memory controller 44 may be further configured to determine if an access request for the 2LM 45 results in a tag match, and return data from the cache portion of the NM 46 if the access request results in the tag match. For example, the memory controller 44 may also be configured to swap data in the cache portion of the NM 46 with data in the FM 47 if the access request results in a tag mismatch. In some embodiments, the memory controller 44 may be further configured to expose the total memory capacity to an operating system which includes the capacity of the system memory portion of the NM 46 plus the capacity of the FM 47.

In some embodiments, the memory controller 44 may be integrated on a same die as the processor 48, while the near and far memories 46, 47 may be separate components. In some embodiments, the NM 46 and the FM 47 may have different interfaces with the processor 48, and may not share a bus. In some embodiments, the memory controller 44 may be physically or logically divided as a direct access memory controller, a near memory controller, and/or a far memory controller.

Figure 5:
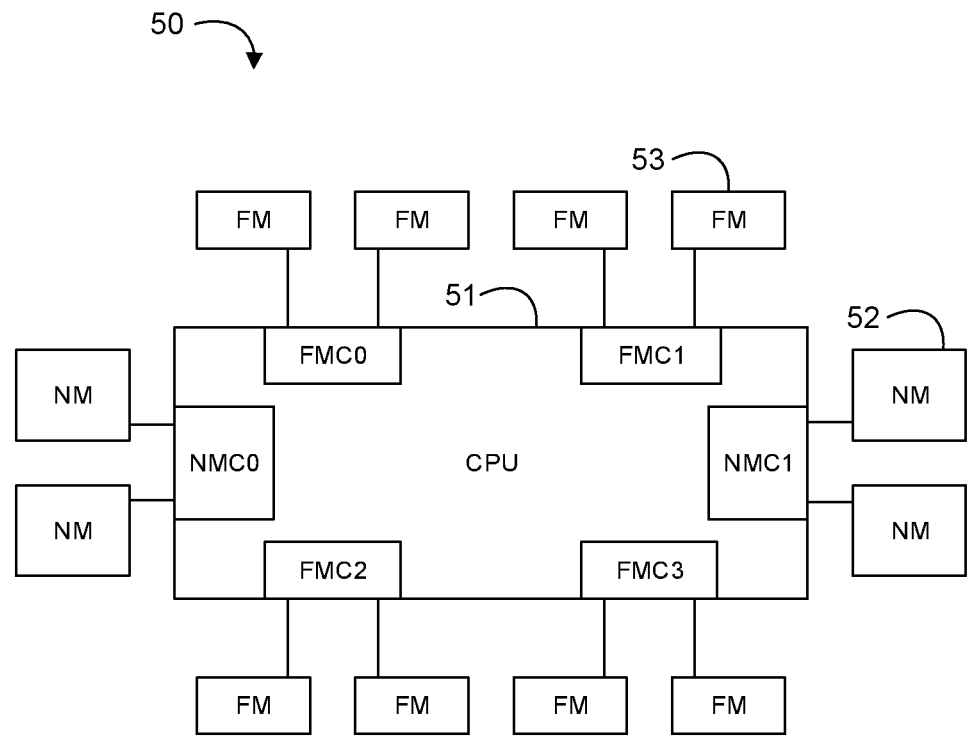
FIG. 5 is a block diagram of an example of another electronic system according to an embodiment.

Turning now to FIG. 5, an embodiment of an electronic processing system 50 may include a CPU 51 with integrated near memory controllers NMC0 and NMC1 and far memory controllers FMC0 through FMC3 respectively coupled to NM 52 and FM 53. For example, the NM 52 may include four (4) stacks of DDR or HBM with 16 GB/stack and a total NM capacity of 64 GB, while the FM 53 may include eight (8) channels of DDR or byte-addressable NVM (e.g., INTEL 3DXPOINT) with 16 GB per channel and a total FM capacity of 128 GB. In a conventional 2LM arrangement, the total capacity exposed to the OS/SW would correspond to the FM capacity of 128 GB. In accordance with some embodiments, the system 50 may include technology to use the NM 52 as both memory-side-cache for the FM 53 and direct-accessed memory. Advantageously, the total capacity exposed to the OS/SW is greater than the FM capacity alone and may be up to the combined capacity of the NM 52 plus the FM 53 (e.g., up to 64 GB plus 128 GB=192 GB).

In this example, the NM 52 is used as direct access flat memory and as cache to the FM 53. The cache/home agent always sends request to the NM controller(s) (e.g., NMC0 and/or NMC1. The NMC reads the NM 52, and if the read results tag match the read corresponds to a 2LM hit and data is returned from the NM 52. If the read results in a tag mismatch, the NMC swaps the data in the NM52 with the data in the FM 53. Any suitable 2LM technology/flow may be utilized for an inclusive and/or non-inclusive write sent from the cache/home agent.

Figure 6A:
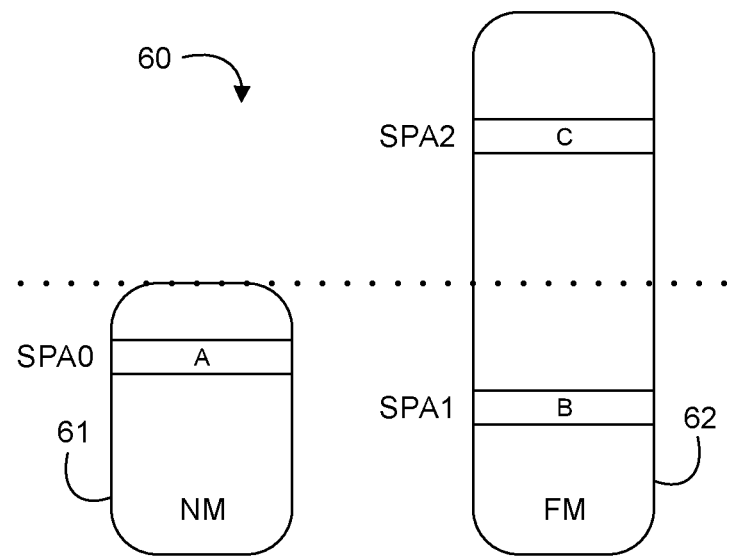
FIG. 6A is a block diagram of an example of an electronic 2LM system according to an embodiment.

With reference to FIGS. 6A to 6C, an embodiment of a 2LM system 60 includes a NM 61 and a FM 62. The dotted line represents a nominal division of the FM 62 into two portions. In this example, three (3) system addresses {A, B, C} can go to three (3) possible locations: one (1) in the NM 61 and two (2) in the FM 62. The NM-FM capacity ratio is 1:2 and NM:{NM+FM} ratio is 1:4. The three locations can have six (6) encoded values {ABC, ACB, BAC, BCA, CBA, CAB} which are saved as a tag in the NM 61 (e.g., see an example tag encoding lookup table in FIG. 6C).

Figure 7A:
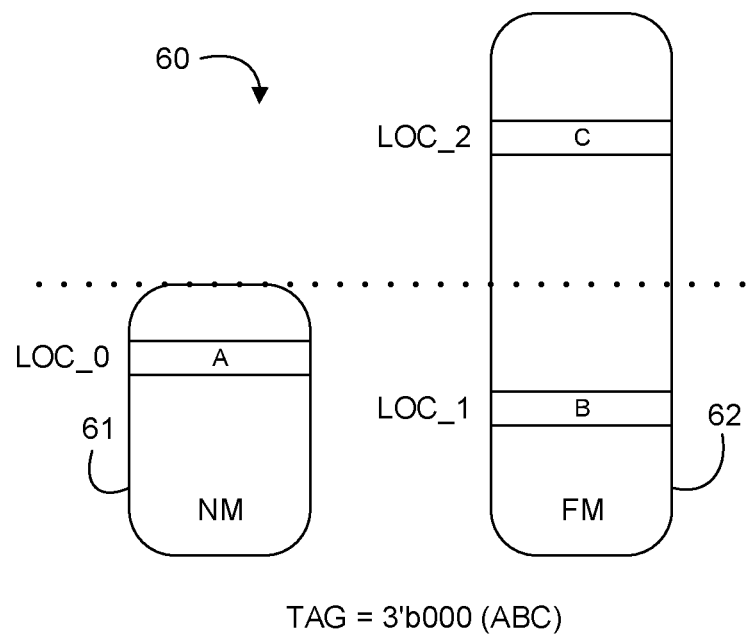
FIGS. 7A to 7B are block diagrams of an example flow for the electronic 2LM system from FIG. 6A.
Figure 7B:
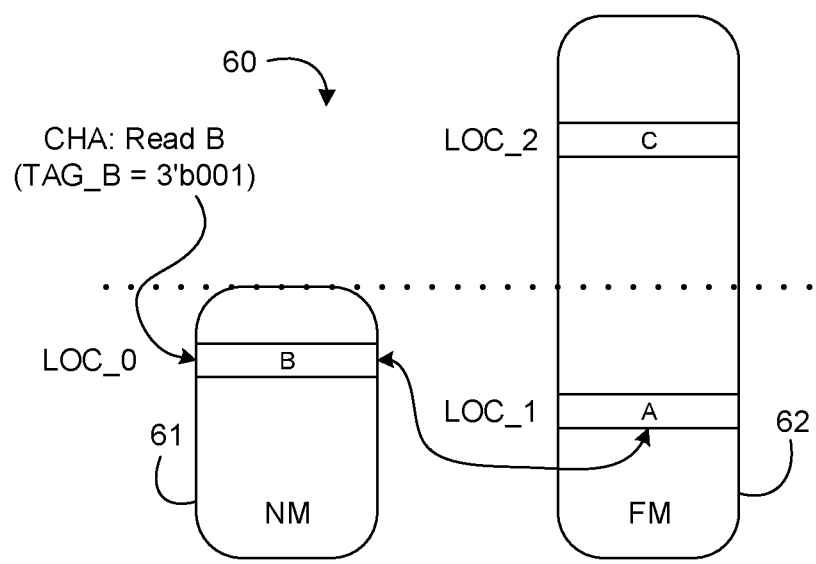

With reference to FIGS. 7A to 7B, the system 60 starts with a tag=3'b000 (ABC). The cache/home agent sends the read request B to the NM 61. The request B has a tag value 3'b001. The NMC reads the NM 61 location and compares its tag=3'b000 with the read request B tag value, 3'b001, and finds a mismatch. The NMC issues a fill request with an address=B to the FM 61. After the fill request comes back, data B is written into the NM 61. The NMC also holds data A. After the fill B to the NM 61 completes, the NMC sends an eviction request to the FM 61 with an address=A and data A. When the request is completed, the NM 61 location has tag=3'b010 (BAC).

Figure 8A:
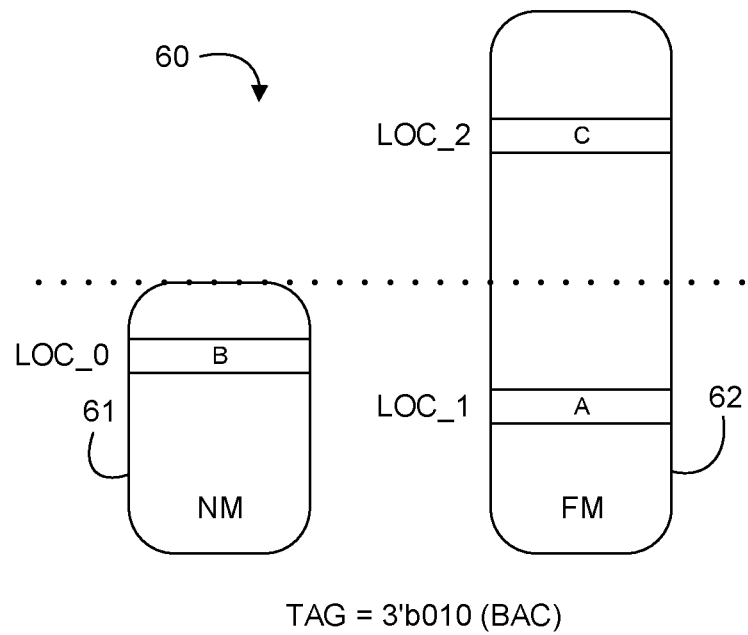
FIGS. 8A to 8B are block diagrams of another example flow for the 2LM system from FIG. 6A.
Figure 8B:
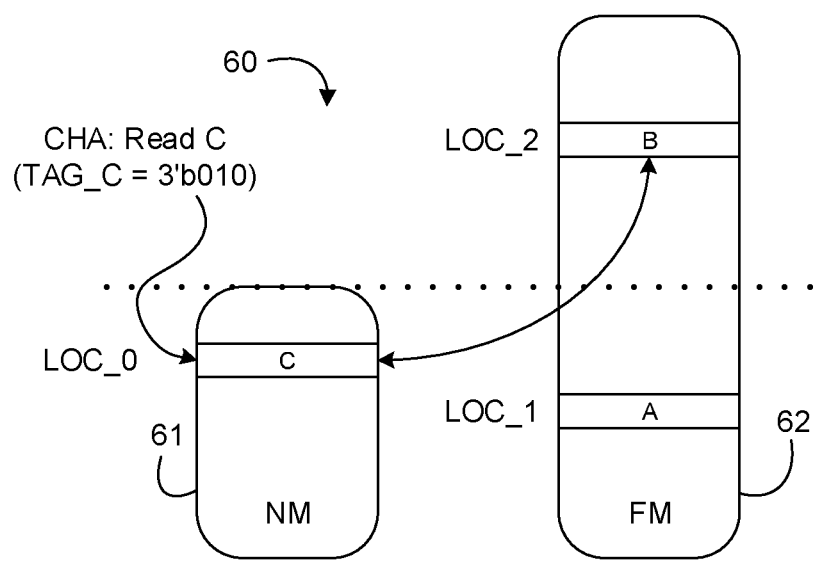

With reference to FIGS. 8A to 8B, a similar process flow may be followed where BAC can be swapped as CAB.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 9:
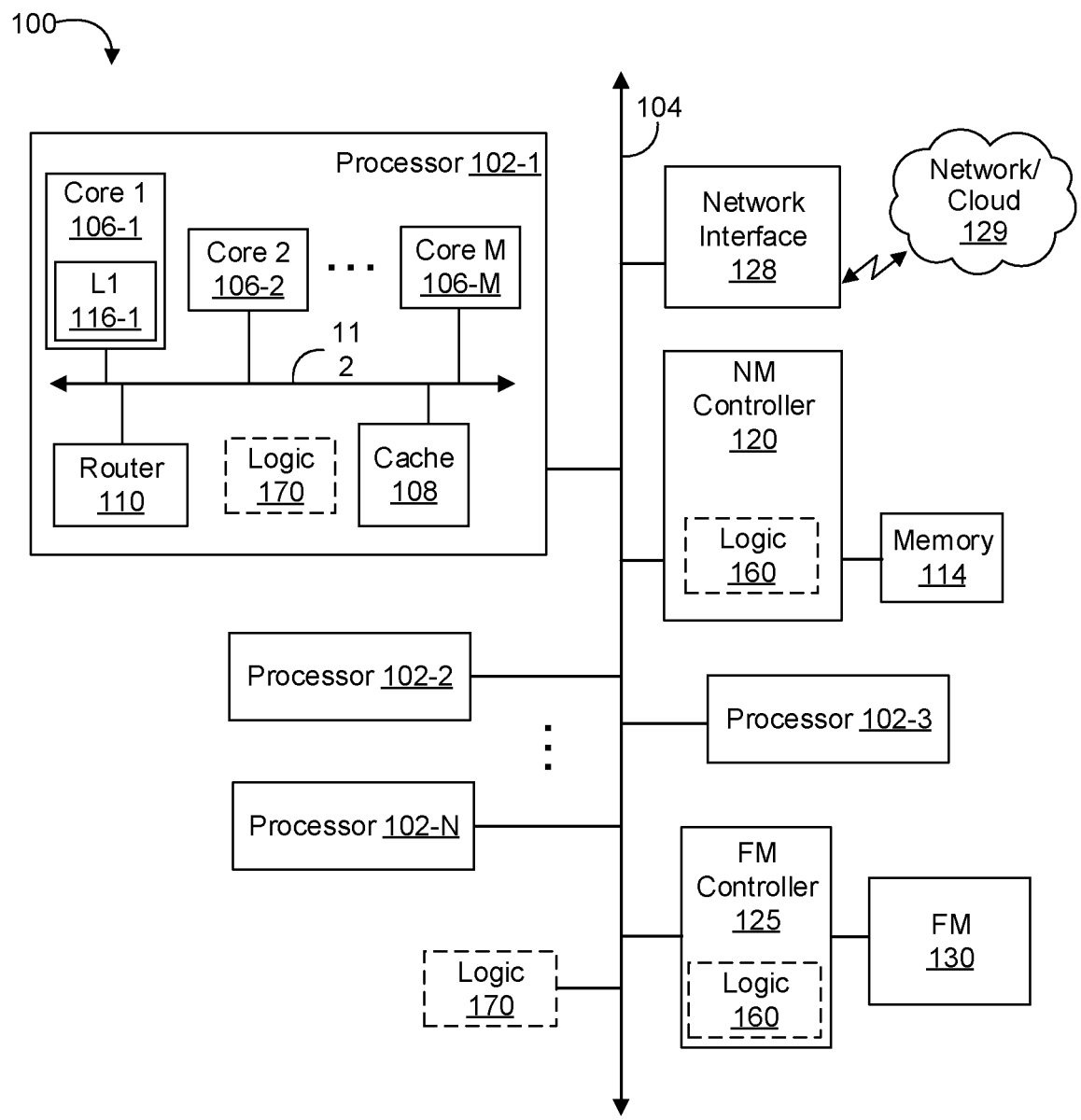
FIG. 9 is a block diagram of an example of a computing system according to an embodiment.

Turning now to FIG. 9, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 or FM 130 for faster access by the components of the processor 102. As shown in FIG. 9, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 9, memory 114 may be coupled to other components of system 100 through a NM controller (NMC) 120. Memory 114 and FM 130 may operate as a 2LM and may together be interchangeably referred to as main memory. Even though the NMC 120 is shown to be coupled between the interconnection 104 and the memory 114, the NMC 120 may be located elsewhere in system 100. For example, NMC 120 or portions of it may be provided within one of the processors 102 in some embodiments. Advantageously, NMC 120 may include logic 160 configured to utilize the memory 114 as both a memory-side cache for FM 130 and direct access memory for the processors 102.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a large capacity memory such as the FM 130 coupled to the interconnect 104 via FM controller (FMC) 125. Hence, FMC 125 may control access by various components of system 100 to the FM 130. Furthermore, even though FMC 125 is shown to be directly coupled to the interconnection 104 in FIG. 9, FMC 125 can alternatively communicate via a bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the bus is coupled to interconnect 104 via some other logic like a bus bridge, chipset, etc.) Additionally, FMC 125 may be incorporated into other memory controller logic or provided on a same integrated circuit (IC) device in various embodiments (e.g., on the same circuit board device as the FM 130 or in the same enclosure as the FM 130). Advantageously, the FMC 125 may include logic 160 configured to utilize a portion of the memory 114 as a cache for FM 130 in a 2LM system.

Furthermore, FMC 125 and/or FM 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, FM 130, FM bus, SATA bus, FMC 125, logic 160, logic 170, etc., to sense variations in various factors affecting power/thermal behavior of the system/platform, such as temperature, operating frequency, operating voltage, power consumption, and/or inter-core communication activity, etc.

As illustrated in FIG. 9, the FM 130 may include logic 160, which may be in the same enclosure as the FM 130 and/or fully integrated on a printed circuit board (PCB) of the FM 130. The system 100 may include further logic 170 outside of the FM 130. Advantageously, the logic 160 and/or logic 170 may include technology to implement one or more aspects of the method 25 (FIGS. 3A to 3C), the system 10, the apparatus 20, the system 40, the system 50, the system 60, and/or any of the extended capacity 2LM features discussed herein. For example, the logic 170 may include technology to implement the host device/computer system/agent aspects of the various embodiments described herein (e.g., requesting information from the memory 114 or 2LM system, sending information to the memory 114 or 2LM system, etc.). For example, the logic 160 may include technology to control access to the 2LM system, provide direct access to a main memory portion of the memory 114 based on a system memory address, cache accesses to the FM 130 in a cache portion of the memory 114, and address a memory space with a total memory capacity which includes a first capacity of the main memory portion of the memory 114 plus a second capacity of the FM 130. In some embodiments, the NMC 120 may be configured to encode a tag to indicate a location of data in one of the cache portion of the memory 114 and the FM 130. For example, NMC 120 may be configured to encode the tag to indicate whether data is located in the cache portion of the memory 114 or one of two or more locations in the FM 130.

In some embodiments of the system 100, the NMC 120 may be further configured to determine if an access request for the 2LM results in a tag match, and return data from the cache portion of the memory 114 if the access request results in the tag match. For example, the NMC 120 may also be configured to swap data in the cache portion of the memory 114 with data in the FM 130 if the access request results in a tag mismatch. In some embodiments, the NMC 120 may be further configured to expose a total memory capacity to an operating system which includes a first capacity of the memory 114 plus a second capacity of the FM 130.

In some embodiments, the FM 130 may be configured with any suitable memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. As shown in FIG. 9, features or aspects of the logic 160 and/or the logic 170 may be distributed throughout the system 100, and/or co-located/integrated with various components of the system 100.

ADDITIONAL NOTES AND EXAMPLES

Example 1 includes an electronic system, comprising a multi-level memory including at least a first level memory and a second level memory, a processor coupled to the multi-level memory, a memory controller coupled to the processor and the multi-level memory, the memory controller including logic to provide direct access to a first portion of the first level memory based on a system memory address, cache accesses to the second level memory in a second portion of the first level memory, and address a memory space with a total memory capacity which includes a first capacity of the first portion of the first level memory plus a second capacity of the second level memory.

Example 2 includes the system of Example 1, wherein the logic is further to encode a tag to indicate a location of data in one of the second portion of the first level memory and the second level memory.

Example 3 includes the system of Example 2, wherein the logic is further to encode the tag to indicate whether data is located in the second portion of the first level memory or one of two or more locations in the second level memory.

Example 4 includes the system of any of Examples 1 to 3, wherein the logic is further to determine if an access request for the multi-level memory results in a tag match, return data from the second portion of the first level memory if the access request results in the tag match.

Example 5 includes the system of Example 4, wherein the logic is further to swap data in the second portion of the first level memory with data in the second level memory if the access request results in a tag mismatch.

Example 6 includes the system of any of Examples 1 to 5, wherein the logic is further to expose the total memory capacity to an operating system which includes the first capacity of the first portion of the first level memory plus the second capacity of the second level memory.

Example 7 includes the system of any of Examples 1 to 6, wherein the first level memory includes volatile memory such as HBM DRAM and wherein the second level memory includes memory such as DDR memory which is higher in capacity as compared to the first level memory.

Example 8 includes an electronic memory controller apparatus, comprising a substrate, logic coupled to the substrate, the logic to control access to a multi-level memory including at least a first level memory and a second level memory, provide direct access to a first portion of the first level memory based on a system memory address, cache accesses to the second level memory in a second portion of the first level memory, and address a memory space with a total memory capacity which includes a first capacity of the first portion of the first level memory plus a second capacity of the second level memory.

Example 9 includes the apparatus of Example 8, wherein the logic is further to encode a tag to indicate a location of data in one of the second portion of the first level memory and the second level memory.

Example 10 includes the apparatus of Example 9, wherein the logic is further to encode the tag to indicate whether data is located in the second portion of the first level memory or one of two or more locations in the second level memory.

Example 11 includes the apparatus of any of Examples 8 to 10, wherein the logic is further to determine if an access request for the multi-level memory results in a tag match, return data from the second portion of the first level memory if the access request results in the tag match.

Example 12 includes the apparatus of Example 11, wherein the logic is further to swap data in the second portion of the first level memory with data in the second level memory if the access request results in a tag mismatch.

Example 13 includes the apparatus of any of Examples 8 to 12, wherein the logic is further to expose the total memory capacity to an operating system which includes the first capacity of the first portion of the first level memory plus the second capacity of the second level memory.

Example 14 includes the apparatus of any of Examples 8 to 13, wherein the first level memory includes HBM memory and wherein the second level memory includes DDR memory which is higher in capacity as compared to the first level memory.

Example 15 includes a method of controlling memory, comprising controlling access to a multi-level memory including at least a first level memory and a second level memory, providing direct access to a first portion of the first level memory based on a system memory address, caching accesses to the second level memory in a second portion of the first level memory, and addressing a memory space with a total memory capacity which includes a first capacity of the first portion of the first level memory plus a second capacity of the second level memory.

Example 16 includes the method of Example 15, further comprising encoding a tag to indicate a location of data in one of the second portion of the first level memory and the second level memory.

Example 17 includes the method of Example 16, further comprising encoding the tag to indicate whether data is located in the second portion of the first level memory or one of two or more locations in the second level memory.

Example 18 includes the method of any of Examples 15 to 17, further comprising determining if an access request for the multi-level memory results in a tag match, returning data from the second portion of the first level memory if the access request results in the tag match.

Example 19 includes the method of Example 18, further comprising swapping data in the second portion of the first level memory with data in the second level memory if the access request results in a tag mismatch.

Example 20 includes the method of any of Examples 15 to 19, further comprising exposing the total memory capacity to an operating system which includes the first capacity of the first portion of the first level memory plus the second capacity of the second level memory.

Example 21 includes the method of any of Examples 15 to 20, wherein the first level memory includes HBM memory and wherein the second level memory includes DDR memory which is higher in capacity as compared to the first level memory.

Example 22 includes at least one machine readable medium comprising a plurality of instructions that, in response to being executed on a computing device, cause the computing device to control access to a multi-level memory including at least a first level memory and a second level memory, provide direct access to a first portion of the first level memory based on a system memory address, cache accesses to the second level memory in a second portion of the first level memory, and address a memory space with a total memory capacity which includes a first capacity of the first portion of the first level memory plus a second capacity of the second level memory.

Example 23 includes the machine readable medium of Example 22, comprising a plurality of further instructions that, in response to being executed on the computing device, cause the computing device to encode a tag to indicate a location of data in one of the second portion of the first level memory and the second level memory.

Example 24 includes the machine readable medium of Example 23, comprising a plurality of further instructions that, in response to being executed on the computing device, cause the computing device to encode the tag to indicate whether data is located in the second portion of the first level memory or one of two or more locations in the second level memory.

Example 25 includes the machine readable medium of any of Examples 22 to 24, comprising a plurality of further instructions that, in response to being executed on the computing device, cause the computing device to determine if an access request for the multi-level memory results in a tag match, return data from the second portion of the first level memory if the access request results in the tag match.

Example 26 includes the machine readable medium of Example 25, comprising a plurality of further instructions that, in response to being executed on the computing device, cause the computing device to swap data in the second portion of the first level memory with data in the second level memory if the access request results in a tag mismatch.

Example 27 includes the machine readable medium of any of Examples 22 to 26, comprising a plurality of further instructions that, in response to being executed on the computing device, cause the computing device to expose the total memory capacity to an operating system which includes the first capacity of the first portion of the first level memory plus the second capacity of the second level memory.

Example 28 includes the machine readable medium of any of Examples 22 to 27, wherein the first level memory includes HBM memory and wherein the second level memory includes DDR memory which is higher in capacity as compared to the first level memory.

Example 29 includes a memory controller apparatus, comprising means for controlling access to a multi-level memory including at least a first level memory and a second level memory, means for providing direct access to a first portion of the first level memory based on a system memory address, means for caching accesses to the second level memory in a second portion of the first level memory, and means for addressing a memory space with a total memory capacity which includes a first capacity of the first portion of the first level memory plus a second capacity of the second level memory.

Example 30 includes the apparatus of Example 29, further comprising means for encoding a tag to indicate a location of data in one of the second portion of the first level memory and the second level memory.

Example 31 includes the apparatus of Example 30, further comprising means for encoding the tag to indicate whether data is located in the second portion of the first level memory or one of two or more locations in the second level memory.

Example 32 includes the apparatus of any of Examples 29 to 31, further comprising means for determining if an access request for the multi-level memory results in a tag match, means for returning data from the second portion of the first level memory if the access request results in the tag match.

Example 33 includes the apparatus of Example 32, further comprising means for swapping data in the second portion of the first level memory with data in the second level memory if the access request results in a tag mismatch.

Example 34 includes the apparatus of any of Examples 29 to 33, further comprising means for exposing the total memory capacity to an operating system which includes the first capacity of the first portion of the first level memory plus the second capacity of the second level memory.

Example 35 includes the apparatus of any of Examples 29 to 34, wherein the first level memory includes HBM memory and wherein the second level memory includes DDR memory which is higher in capacity as compared to the first level memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic system, comprising:
   a multi-level memory including at least a first level memory and a second level memory;
   a processor coupled to the multi-level memory; and
   one or more memory controllers coupled to the processor and the multi-level memory,
   the one or more memory controllers including logic to:
   provide direct access to a first portion of the first level memory,
   cache accesses to the second level memory in a second portion of the first level memory, and
   address a memory space with a memory capacity that corresponds to a summed capacity of a first capacity of the first portion of the first level memory plus a second capacity of the second level memory,
   wherein the second level memory is nominally divided into a third portion that corresponds to first locations of the second level memory and a fourth portion that corresponds to second locations of the second level memory that are different from the third portion, and wherein the logic is further to:
   encode a tag with a value that represents which of the first portion of the first level memory and the third and fourth portions of the second level memory respectively stores data associated with at least three different system addresses.

2. The system of claim 1, wherein the logic is further to: encode a tag with a value that represents a location of data in one of the first portion of the first level memory and the second level memory.

3. The system of claim 2, wherein the logic is further to: encode the tag with a value that represents whether data is located at one of a first location in the first portion of the first level memory, a second location in the second level memory, and a third location in the second level memory.

4. The system of claim 1, wherein the logic is further to: determine if an access request for the multi-level memory results in a multi-level memory hit based on a tag match between a first tag value of the access request and a second tag value of a first location in the first portion of the first level memory; and
   return data from the first portion of the first level memory if the access request results in the tag match.

5. The system of claim 4, wherein the logic is further to: swap first data at the first location in the first portion of the first level memory with second data at a second location in the second level memory if the access request results in a tag mismatch, where the second data is different from the first data.

6. The system of claim 1, wherein the logic is further to: expose a memory capacity to an operating system that corresponds to the summed capacity of the first capacity of the first portion of the first level memory plus the second capacity of the second level memory.

7. An electronic memory controller apparatus, comprising:
   a substrate; and
   logic coupled to the substrate, the logic to:

control access to a multi-level memory including at least a first level memory and a second level memory,
provide direct access to a first portion of the first level memory,
cache accesses to the second level memory in a second portion of the first level memory, and
address a memory space with a memory capacity that corresponds to a summed capacity of a first capacity of the first portion of the first level memory plus a second capacity of the second level memory, wherein the second level memory is nominally divided into a third portion that corresponds to first locations of the second level memory and a fourth portion that corresponds to second locations of the second level memory that are different from the third portion, and wherein the logic is further to:
encode a tag with a value that represents which of the first portion of the first level memory and the third and fourth portions of the second level memory respectively stores data associated with at least three different system addresses.

8. The apparatus of claim 7, wherein the logic is further to:
encode a tag with a value that represents a location of data in one of the second portion of the first level memory and the second level memory.

9. The apparatus of claim 8, wherein the logic is further to:
encode the tag with a value that represents whether data is located in the second portion of the first level memory or one of two or more locations in the second level memory.

10. The apparatus of claim 7, wherein the logic is further to:
determine if an access request for the multi-level memory results in a tag match; and
return data from the second portion of the first level memory if the access request results in the tag match.

11. The apparatus of claim 10, wherein the logic is further to:
swap data in the first portion of the first level memory with data in the second level memory if the access request results in a tag mismatch.

12. The apparatus of claim 7, wherein the logic is further to:
expose a memory capacity to an operating system that corresponds to the summed capacity of the first capacity of the first portion of the first level memory plus the second capacity of the second level memory.

13. The apparatus of claim 7, wherein the first level memory includes high bandwidth memory and wherein the second level memory includes double data rate memory which is higher in capacity as compared to the first level memory.

14. An electronic system, comprising:
a multi-level memory including at least a near memory and a far memory, wherein the multi-level memory is nominally divided into a first portion that corresponds to first locations of the far memory, a second portion that corresponds to second locations of the far memory that are different from the first portion, a third portion that corresponds to first locations of the near memory, and a fourth portion that corresponds to second locations of the near memory that are different from the third portion;
a processor coupled to the multi-level memory; and
one or more memory controllers coupled to the processor and the multi-level memory, the one or more memory controllers including logic to:
provide direct access to the third portion of the multi-level memory,
cache accesses to the first and second portions of the multi-level memory in the fourth portion of the multi-level memory, and
address a system memory space with a memory capacity that corresponds to a summed overall capacity of the first, second, and third portions of the multi-level memory.

15. The system of claim 14, wherein the logic is further to:
encode a single tag with a value that represents which of the first, second, and third portions of the multi-level memory respectively stores data associated with a set of respective system addresses.

16. The system of claim 14, wherein the logic is further to:
manage respective groups of three different system addresses such that respective data associated with each address of a group of three different system addresses is stored in a different one of the first, second, and third portions of the multi-level memory; and
encode a single tag with a value that specifies which of the first, second, and third portions of the multi-level memory respectively stores data associated with each address of the group of three different system addresses.

17. The system of claim 14, wherein the logic is further to:
determine if an access request for the multi-level memory results in a multi-level memory hit based on a tag match between a first tag value of the access request and a second tag value of third portion of multi-level memory; and
return data from the third portion of multi-level memory if the access request results in the tag match.

18. The system of claim 17, wherein the logic is further to:
swap first data located at the third portion of multi-level memory with second data located at one of the first and second portions of multi-level memory if the access request results in a tag mismatch, where the second data is different from the first data.

19. The system of claim 14, wherein the logic is further to:
expose a memory capacity to an operating system that corresponds to the summed overall capacity of the first, second, and third portions of the multi-level memory.

* * * * *